United States Patent [19]
Fukuyama

[11] Patent Number: 6,136,355
[45] Date of Patent: *Oct. 24, 2000

[54] PROCESS FOR PRODUCING AS-PACKAGED INSTANT COOKING PASTAS AND NOODLES

[75] Inventor: Teruyasu Fukuyama, Kagoshima-ken, Japan

[73] Assignee: Feed Up Inc., Kagoshima-ken, Japan

[ * ] Notice: This patent is subject to a terminal disclaimer.

[21] Appl. No.: 09/095,308

[22] Filed: Jun. 10, 1998

[30] Foreign Application Priority Data

Jun. 11, 1997 [JP] Japan .................................. 9-153230

[51] Int. Cl.[7] ................................ A23L 3/01; A21D 6/00
[52] U.S. Cl. ......................... 426/325; 426/402; 426/410; 426/451
[58] Field of Search ..................................... 426/549, 325, 426/557, 410, 402, 451

[56] References Cited

U.S. PATENT DOCUMENTS

| | | | |
|---|---|---|---|
| 4,423,082 | 12/1983 | Bauernfeind et al. | 426/557 |
| 4,540,590 | 9/1985 | Harda et al. | 426/324 |
| 4,734,291 | 3/1988 | Raffensperger | 426/325 |
| 4,973,487 | 11/1990 | Wyss et al. | 426/557 |
| 5,342,634 | 8/1994 | Murata et al. | 426/113 |
| 5,573,804 | 11/1996 | Hsu et al. | 426/496 |
| 5,817,356 | 10/1998 | Gum et al. | 426/325 |
| 5,861,186 | 1/1999 | Akira et al. | 426/446 |

*Primary Examiner*—Nina Bhat
*Attorney, Agent, or Firm*—Browdy and Neimark

[57] ABSTRACT

Dry pastas or noodles are heated with either wet or dry heat to convert their surface layer portion to the α-starch form and, if the heating is done by wet heat, the moisture in the surface of the pasta or noodle strings is removed and, thereafter, the pasta or noodle strings are put into a sealable container, which is then injected with a specified amount of water and sealed, followed by reheating of the pasta or noodle strings. Pastas such as spaghetti and macaroni or noodles such as *udon, soba, hiyamugi, kishimen* and Chinese noodles can be cooked by just boiling them or a short time or heating them in a microwave oven and yet they develop the same texture as can be attained by fully boiling dry or raw pastas or noodles.

8 Claims, No Drawings

PROCESS FOR PRODUCING AS-PACKAGED INSTANT COOKING PASTAS AND NOODLES

FIELD OF THE INVENTION

This invention relates to a process for producing pastas such as spaghetti, macaroni and shells or Japanese noodles such as *udon, soba, hiyamugi, kishimen* or Chinese noodles that can be prepared by just boiling up within short times not longer than three minutes, preferably not longer than one minute and which yet can be served to provide good palatability.

BACKGROUND OF THE INVENTION

Pastas are produced by adding water to wheat flour, kneading the mixture to prepare a dough of firm consistency and shaping the dough by extrusion through an extruder or the like under high pressure. Typically, the semolina of durum which is a hard wheat (or high gluten content) is used as a primary raw material, which is occasionally mixed with egg white, milk and other ingredients. The pastas thus produced are in hard and dense shapes. Pastas are prepared by boiling and are cooked to provide a moisture gradient such that the moisture content in the center of the pasta is lower than the surface moisture content; the pastas are said to taste best when served "al dente" with a "firm" texture.

To create the "al dente" condition, the use of dry or raw pastas is preferred; however, these pastas take a long time to boil and are unsuitable for the case where convenience and speed in cooking are required.

Several methods have been attempted to serve pastas "al dente" with improved convenience and speed in cooking, including providing V cuts along the strings of pastas such as spaghetti or quickly freezing pastas that have been boiled "al dente". However, even the pastas with V cuts cannot be cooked as quickly and conveniently as "instant noodles". Frozen pastas have no problems with quality but because of the limitations in distribution and storage on the market, they have not become as popular as "instant noodles".

As for noodles including Japanese noodles such as *udon, soba, hiyamugi* and *kishimen* and Chinese noodles, various methods have also been proposed to accomplish the manufacture of quick boiling products. According to the known proposals, partially cooked noodles prepared by boiling raw noodles for a short time or boiled products prepared by boiling raw or dry noodles are distributed either chilled or frozen. However, these partially cooked noodles or preboiled noodles have had the problem that during the distribution, not only their palatability deteriorates but also the strings become "too tender" with the lapse of time, thereby deteriorating in texture.

Various types of "instant noodles" are manufactured and sold on the market. They are produced by either frying raw noodles with oil or fats or steaming them followed by drying. However, either type of product has the disadvantage that when cooked, the noodles do not have as firm a texture as the products prepared by boiling dry or raw noodles.

Under the circumstances, it has been desired to develop instant cooking pastas or noodles that are easy to manufacture, that can be cooked and served "al dente" or with firm consistency by merely boiling up in hot water for a short cooking time, say, within three minutes or by just heating in a microwave oven.

SUMMARY OF THE INVENTION

The present invention provides a process for the manufacture of instant cooking pastas or Japanese or Chinese noodles which comprises heating dry pastas or Japanese or Chinese noodles with either wet or dry heat to convert their surface layer portion to the α-starch form, drying the surfaces of pasta or noodle strings if the heating is effected with wet heat, and thereafter packaging the pasta or noodle strings in a sealable container such as a plastic bag, injecting a specified amount of water into the container (or bag), sealing it, and reheating the pasta or noodle strings within the package as by immersing in hot water. (Japanese or Chinese noodles are hereinbelow after referred to as "noodle".) The instant cooking pastas or noodles that are produced by the process of the invention need only to be boiled for as short a time as three minutes or less in order to acquire the same "al dente" condition or the same consistency as can be attained by prolonged boiling of dry pastas or noodles.

The present invention relates to a process for producing instant cooking pastas or noodles which comprises the steps of heating dry pastas or noodles (pastas and noodles are hereinafter sometimes collectively referred to as "pasta or the like") so that their surface layer portion is converted to the α-starch form, drying the pasta or the like to remove the surface moisture if the heating step is performed by exposure to wet heat, subsequently filling a sealable container such as bag made of plastic sheeting with the pasta or noodle strings that have been converted to the α-starch form on the surface, injecting a specified amount of water into the container, sealing it and reheating the packaged pasta or the like as by immersing in hot water. According to this process, one can produce instant cooking pastas or noodles that can be cooked to the "al dente" condition or that can be cooked to have firm consistency by just boiling up in hot water for a short time, typically not longer than three minutes, preferably not longer than one minute, more preferably for about 30 seconds or less.

DETAILED DESCRIPTION OF THE INVENTION

The process of the invention for producing instant cooking pasta or the like uses the common dry pasta or the like as a starting material. When immersed in water, dry pastas or noodles will generally absorb water to swell over time to acquire physical properties similar to those of raw pastas or noodles; on the other hand, the swollen product will dissolve at the surface to be leached into water and the surface becomes so fragile that it will be disintegrated by a small physical force. In the present invention, the step of swelling by water absorption is preceded by a heat treatment which is effected for a short but sufficient time to form a film of α-starch form on the surface of the dry pasta or the like. Because of this starch conversion, the surface of the pasta or the like will neither dissolve nor disintegrate even if it absorbs water in the subsequent water absorption swelling step and it is possible to produce pasta or the like which retains a smooth surface even after absorbing water.

Stated more specifically, the dry pastas or noodles are heated for a short but sufficient time to convert an extremely thin surface layer to the α-starch form while leaving the central portion dry. The term "conversion to the α-starch" form as used herein shall mean not only pure conversion to the α-starch form but also the case where the surface portions of the pasta or noodle strings are changed physically or chemically by heating are modified to such a state that those surface portions will neither dissolve nor disintegrate even if they are contacted with water in a subsequent step.

The heating method is effected with wet heat such as by immersing in hot water or by steaming with water vapor, or with dry heat as by exposure to heat rays or heated air. If heated air is to be employed, the dry pasta or the like may be passed through the heated air or the heated air blown over it. However, heating with dry heat is preferred since the pasta or the like will be less sticky on the surface after the heating and water absorption, thereby eliminating the need to provide an additional step for removing the moisture.

The heating may be performed at any temperature that is high enough to convert the starch in the surface layer portion of the pasta or the like to the α-form and it may range from about 40° C. up to a point just below the temperature at which the surface of the pasta or the like scorches (in the case of heating with dry heat). In steaming with water vapor, heating beyond 100° C. is possible by using superheated steam.

The heating temperature and time vary with the type of the pasta or the like, their shape, size and thickness and they range generally from 70 to 180° C. and from several seconds to 30 minutes. In the case of heating with wet heat, the preferred conditions are at 70–100° C. for several seconds to ten minutes, more preferably at 90–100° C. for 15–60 seconds. In the case of heating with dry heat, preferred results are obtained by performing the heat treatment at 70–180° C. for several seconds to five minutes, more preferably at 80–130° C. for 10–90 seconds.

If heating is performed for an unduly short time at high temperatures, the pasta or the like will be heated unevenly or some areas of the surface will be left uncovered with a film of α-starch. If the heating time is unduly long, the pasta or the like tends to be chunky and deteriorated in quality. Optimal heating conditions can be appropriately selected from the above-stated ranges in accordance with the type and shape of the pasta or the like, as well as the object of their use.

The heating for conversion to the α-starch form may be performed to such an extent that the central portion of the pasta or the like remains dry but a thin film of α-starch will form on the surface. The pasta or the like which has been thusly converted to the α-starch form only in the surface layer portion is immediately subjected to the subsequent steps of water absorption and heating but, if desired, it may be left to stand for preliminary cooling.

If the α-converted starch film is formed on the surface of the pasta or the like by heating with wet heat, moisture remains on the surface of the pasta or the like to make it sticky and thereby present inconvenience in subsequent processing and handling procedures. In order to eliminate this problem, the pasta or the like which is dried to remove the surface moisture as by natural drying with them being left to stand, spraying with air at ambient temperature or blowing of hot air prior to the subsequent step of water absorption. As already mentioned, the pasta or the like which has been heated with dry heat does not have a sticky surface even after it absorbs water and, hence, the heating with dry heat which can be implemented by a simpler process then the heating with wet heat is preferred.

The heat-treated pasta or the like is put into a sealable container such as a bag made of plastic sheeting and after injecting 65–120 mL, preferably 70–100 mL, of water per 100 g of dry pastas or noodles, the container is sealed. The temperature of the water to be injected ranges from the ambient to 91° C. and from economic and other viewpoints, the ambient or temperatures obtained by slight warming, for example, temperatures not higher than about 40° C. are preferred. Packaging of the pasta or the like at this stage reduces the risk of secondary bacterial contamination, thereby improving keeping quality.

The pasta or the like as packaged within the sealable container is subjected to secondary heating, which is typically performed by immersing the sealed container within hot water. Heating is typically effected at a temperature 59–91° C., preferably 60–80° C., more preferably 65–75° C. for 30 seconds to 90 minutes, preferably 10–15 minutes, more preferably 11–13 minutes. This secondary heating step accelerates the absorption of water, thereby enabling the manufacture of the desired instant cooking pastas or noodles. Another advantage of this heating step is that upon instant cooking, the pasta or the like is by no means "powdery" but provides smooth palatability together with the desired firmness.

After the secondary heating, the as-packaged pasta or the like is recovered from the heating medium, cooled and packed within a corrugated box for storage or shipment. Cooling of the pasta or the like can be accomplished by leaving it to stand or immersing them it water, either cold or at ambient temperatures or by spraying it with such water.

It is generally held that the "firmness" of boiled pasta or the like is developed by the difference in moisture content between the surface and central portions of each string and the "too tender" state means that the moisture content has become the same in the surface and central portions, whereby the pasta or the like is no longer "firm". If the pasta or the like has absorbed only a small amount of water as the result of water absorption, it must be left to stand for a comparatively long time before it becomes ready to eat after pouring in hot water but, on the other hand, the gradient of moisture content in the surface and central portions is steep enough to provide a firm texture and it takes much time for the cooked pasta or the like to become "too tender". If the pasta or the like has absorbed a large amount of water, it need be left to stand for only a short time before it become ready to eat but, at the same time, it will shortly lose firmness.

The water to be absorbed by the pasta or the like may be mixed with desired seasonings, spices or food additives such as table salt, sugar, acids and alcohols in order to assure better keeping quality in the subsequent stages or for the purpose of seasoning to taste. The seasonings, spices or food additives may be dissolved or suspended in the water to be absorbed such that they can be adsorbed on or absorbed by the pasta or the like during the water absorption.

The instant cooking pastas or noodles of the invention can be rendered "al dente" or allowed to have firm consistency by merely boiling it in hot water for a short time or putting it into a heat-resistant container and heating it in a microwave oven after sprinkling with water. The thus prepared pastas or the like are sufficiently "al dente" or firm that they can be served on the dish affording the same texture and taste as are obtained by boiling ordinary dry or raw pastas or noodles. If desired as in the case of common pastas, they can be sauteed, mixed with ingredients such as meat, vegetable or shellfish to one's own preference or spread with sauce. Alternatively, they can be served as "dip-to-eat" Japanese noodles such as *zaru-udon, mori-soba* and "dip-to-eat" Chinese noodles, affording the same texture as is presented by boiled noodles.

The following example is provided for the purpose of further illustrating the present invention but is in no way to be taken as limiting.

EXAMPLE

A hundred grams of dry spaghetti (1.7 mm$^\phi$) made from the semolina of durum wheat was heated in a dry heating oven at 100° C. for 30 seconds. The spaghetti was then packed in bags made of polyethylene sheeting and after injecting 85 mL of 3% salted water at ambient temperature, the polyethylene sheet was heat sealed. The thus packaged spaghetti was immersed in hot water at 70° C. for 12 minutes and allowed to cool by standing at room temperature (20° C.) for 10–15 minutes. After the cooling, the spaghetti was stored in a refrigerator.

After storage overnight, the spaghetti was taken out of the bags and boiled in water for 80 seconds, thereby providing cooked spaghetti. The spaghetti which had been fully boiled was "al dente" and had the desired firmness.

What is claimed is:

1. A process for the manufacture of instant cooking pastas or noodles which comprises boiling dry pastas or noodles for a time sufficient to convert the surface layer portion of the pastas or noodles to the α-starch form, drying the surfaces of the pastas or noodles, and thereafter packaging the pastas or noodles in a sealable container together with water, sealing the container and subsequently reheating the pastas or noodles.

2. The process according to claim 1, wherein the boiling is performed at 70–100° C. for several seconds to ten minutes.

3. The process according to claim 1, wherein said packaging and subsequent heating steps comprise putting the pastas or noodles into a bag made of plastic film and injecting the bag with 65–120 mL of water per 100 g of the pastas or noodles on a dry weight basis.

4. The process according to claim 3, wherein said water is injected in an amount of 70–100 mL.

5. The process according to claim 3, wherein said water to be injected is at ambient temperature.

6. The process according to claim 1, wherein said reheating step is performed at 59–91° C. for 30 seconds to 90 minutes.

7. The process according to claim 6, wherein said reheating step is performed at 60–80° C. for 10–15 minutes.

8. The process according to claim 7, wherein said reheating step is performed at 65–75° C. for 11–13 minutes.

* * * * *